US010146770B2

(12) United States Patent
Grant et al.

(10) Patent No.: US 10,146,770 B2
(45) Date of Patent: Dec. 4, 2018

(54) COGNITIVE AGENT FOR CAPTURING REFERENTIAL INFORMATION DURING CONVERSATION MUTING

(71) Applicant: International Business Machines Corporation, Armonk, NY (US)

(72) Inventors: Robert H. Grant, Austin, TX (US); Jeremy A. Greenberger, Raleigh, NC (US); Trudy L. Hewitt, Cary, NC (US); Joseph Lam, Markham (CA); Francesco C. Schembari, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 15/366,393

(22) Filed: Dec. 1, 2016

(65) Prior Publication Data

US 2018/0157637 A1 Jun. 7, 2018

(51) Int. Cl.
*G06F 17/24* (2006.01)
*G06F 17/27* (2006.01)
(Continued)

(52) U.S. Cl.
CPC ............ *G06F 17/279* (2013.01); *G06F 17/24* (2013.01); *G06F 17/2705* (2013.01);
(Continued)

(58) Field of Classification Search
CPC ..... G06F 17/24; G06F 17/273; H04L 51/063; H04L 51/04
See application file for complete search history.

(56) References Cited

U.S. PATENT DOCUMENTS 7,082,458 B1    7/2006 Guadagno et al.
7,349,924 B2 *  3/2008 Lyle ...................... G06Q 10/10
                                           704/4
(Continued)

OTHER PUBLICATIONS

"Cognitive Communication Snooze", Disclosed Anonymously, An IP.com Prior Art Database Technical Disclosure, IP.com No. IPCOM000246984D, Jul. 20, 2016, 6 pages.
(Continued)

*Primary Examiner* — Samuel G Neway
(74) *Attorney, Agent, or Firm* — Stephen R. Tkacs; Stephen J. Walder, Jr.; Richard A. Wilhelm

(57) ABSTRACT

A mechanism is provided in a data processing system comprising at least one processor and at least one memory, the at least one memory comprising instructions executed by the at least one processor to cause the at least one processor to implement a cognitive system for capturing referential information. The cognitive system receives a first indication that a group text messaging conversation is in a muted state for a first user. The cognitive system detects a first use of a referential phrase in the group text messaging conversation during a first time period when the group text messaging conversation is in the muted state. The cognitive system receives a second indication that the group text messaging conversation is in a non-muted state. The cognitive system detects a second use of the referential phrase in the group text messaging conversation during a second time period when the group text messaging conversation is in the non-muted state. The second time period is subsequent to the first time period. The cognitive system alters a message containing the second use of the referential phrase within the group text messaging conversation.

20 Claims, 5 Drawing Sheets

(51) Int. Cl.
*H04L 12/58* (2006.01)
*H04L 29/08* (2006.01)

(52) U.S. Cl.
CPC ............ *G06F 17/278* (2013.01); *H04L 51/04* (2013.01); *H04L 51/32* (2013.01); *H04L 67/306* (2013.01); *G06F 17/273* (2013.01); *H04L 51/063* (2013.01)

(56) References Cited

U.S. PATENT DOCUMENTS

| | | | |
|---|---|---|---|
| 8,275,803 B2 | 9/2012 | Brown et al. | |
| 8,527,269 B1* | 9/2013 | Kapur | G06F 17/2735 704/235 |
| 9,185,680 B2 | 11/2015 | Dey et al. | |
| 2003/0003931 A1* | 1/2003 | Silventoinen | H04L 51/063 455/466 |
| 2004/0249819 A1* | 12/2004 | Matsumoto | G06F 17/2735 |
| 2005/0075880 A1* | 4/2005 | Pickover | G06F 17/2785 704/270 |
| 2006/0069728 A1* | 3/2006 | McEvilly | G06F 17/2264 709/206 |
| 2006/0117062 A1* | 6/2006 | Lyle | G06Q 10/10 |
| 2006/0235932 A1* | 10/2006 | Celi, Jr. | H04L 12/1822 709/207 |
| 2007/0174045 A1* | 7/2007 | Kao | G06F 17/278 704/4 |
| 2009/0117881 A1 | 5/2009 | Deshpande | |
| 2009/0287678 A1 | 11/2009 | Brown et al. | |
| 2011/0066587 A1 | 3/2011 | Ferrucci et al. | |
| 2011/0125734 A1 | 5/2011 | Duboue et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0191739 A1* | 7/2013 | Bank | G06F 17/2276 715/259 |
| 2013/0325971 A1* | 12/2013 | Winer | G06Q 10/1091 709/206 |
| 2014/0324984 A1 | 10/2014 | Chang et al. | |
| 2015/0073776 A1 | 3/2015 | Banatwala et al. | |
| 2015/0163182 A1* | 6/2015 | Chandrasekaran | H04L 51/063 709/204 |
| 2015/0195411 A1 | 7/2015 | Krack et al. | |
| 2015/0264312 A1 | 9/2015 | Chastney et al. | |
| 2015/0339573 A1 | 11/2015 | Flinn et al. | |
| 2016/0076902 A1 | 3/2016 | Diaz et al. | |
| 2016/0103808 A1* | 4/2016 | Anders | G06F 17/24 715/261 |
| 2016/0196298 A1 | 7/2016 | Bradley et al. | |

OTHER PUBLICATIONS

High, Rob, "The Era of Cognitive Systems: An inside Look at IBM Watson and How it Works", IBM Corporation, Redbooks, Dec. 12, 2012, 16 pages.

McCord, M.G. et al., "Deep parsing in Watson", IBM J. Res. & Dev. vol. 56 No. 3/4 Paper 3, May/Jul. 2012, pp. 3:1-3:15.

Ogawa, Kohei et al., "Designing Robot Behavior in Conversations based on Contemporary Colloquial Theatre Theory", IEEE, The 23rd IEEE International Symposium on Robot and Human Interactive Communication, Edinburgh, Scotland, UK, Aug. 25-29, 2014, pp. 168-173.

Yuan, Michael J., "Watson and healthcare, How natural language processing and semantic search could revolutionize clinical decision support", IBM developerWorks, IBM Corporation, Apr. 12, 2011, 14 pages.

\* cited by examiner

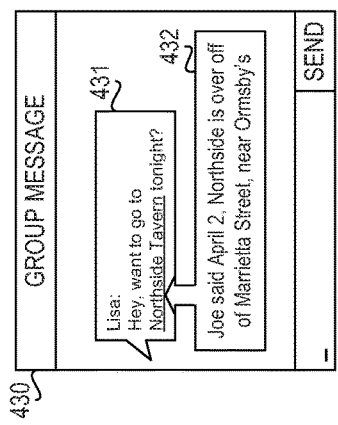
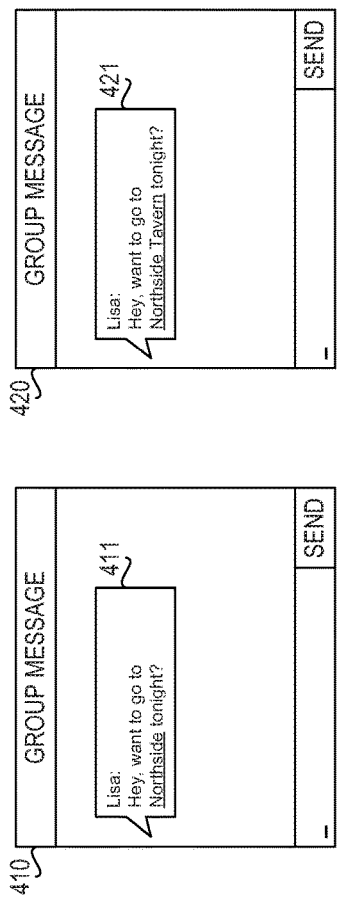
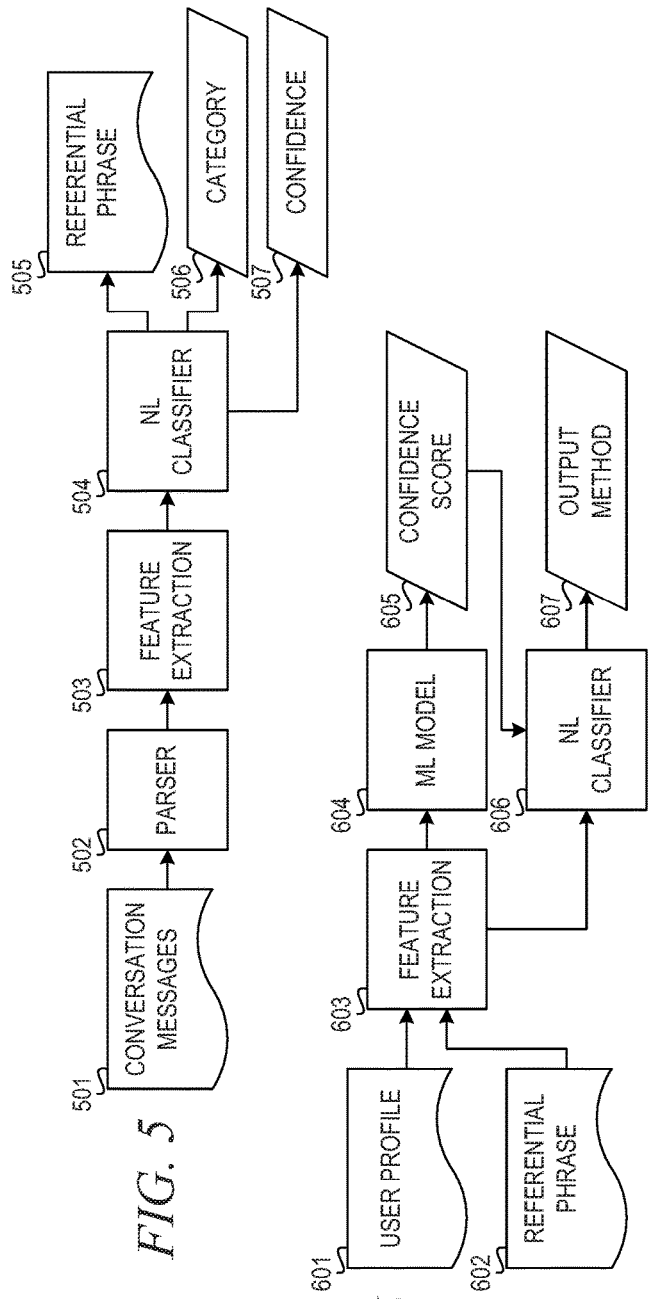

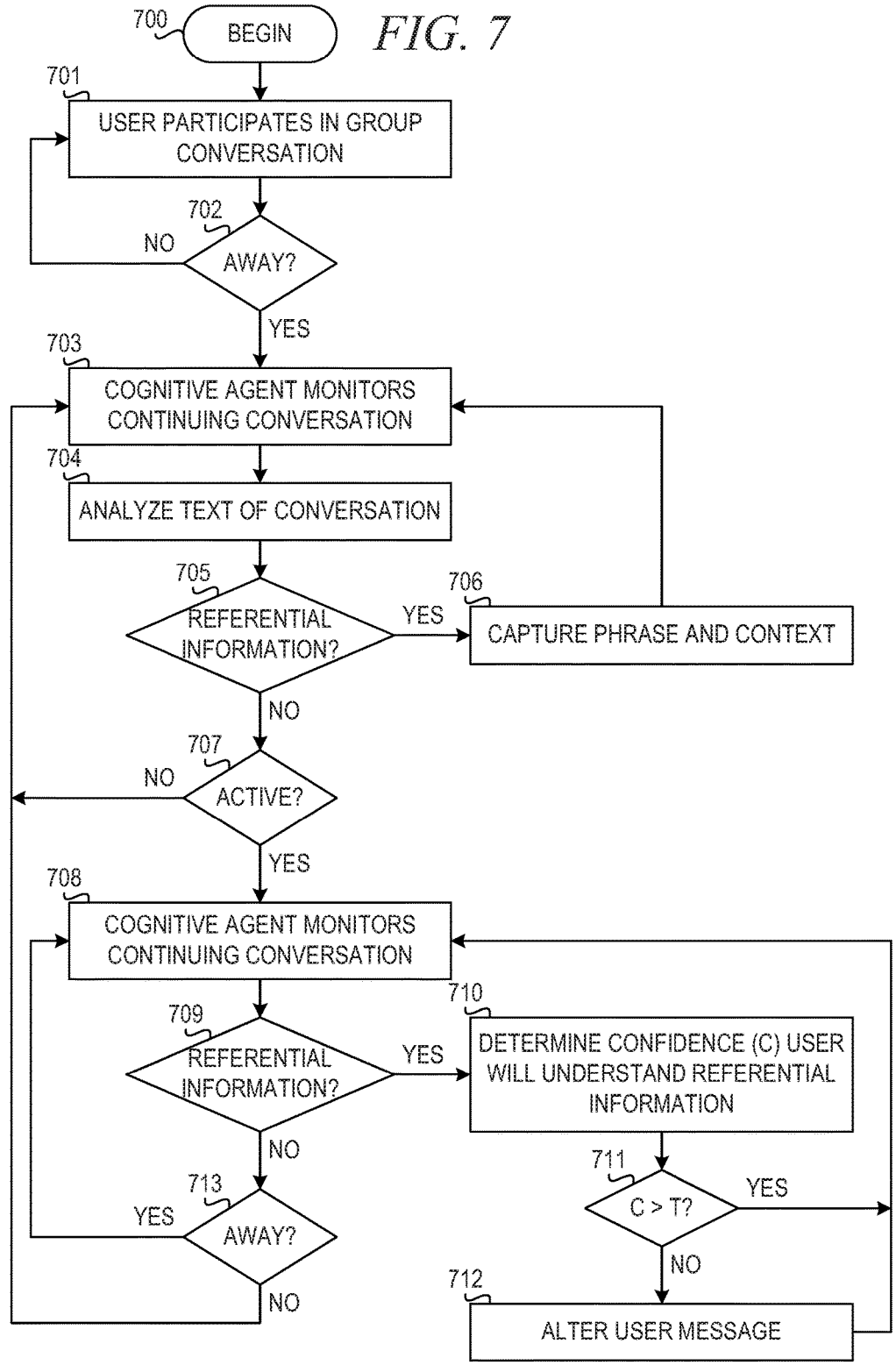

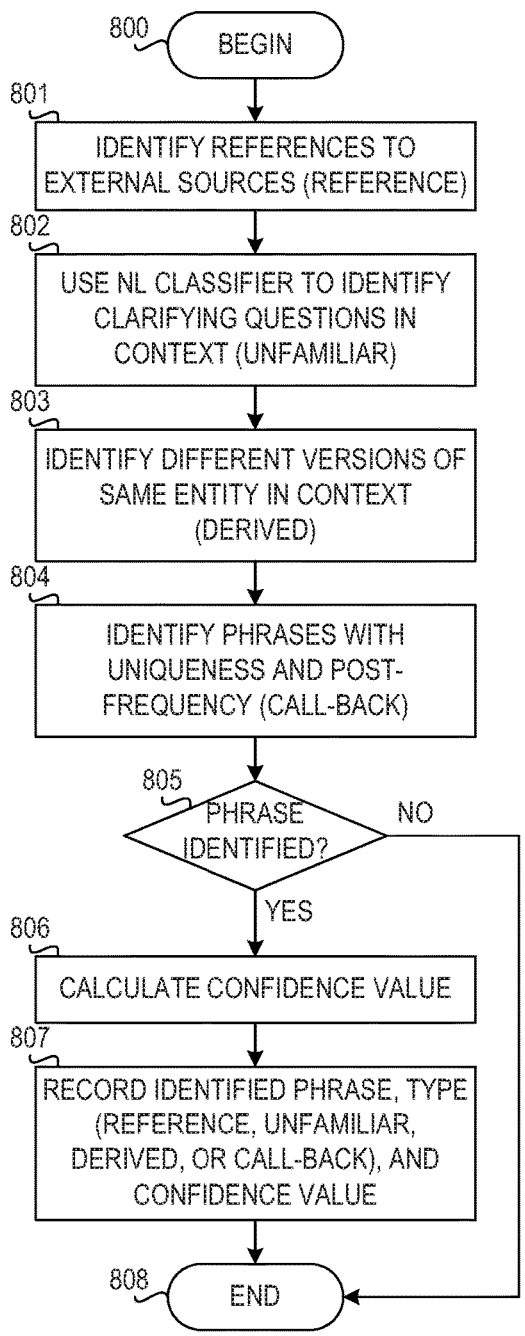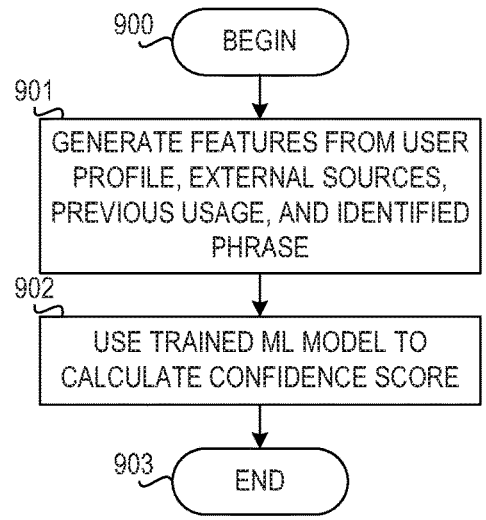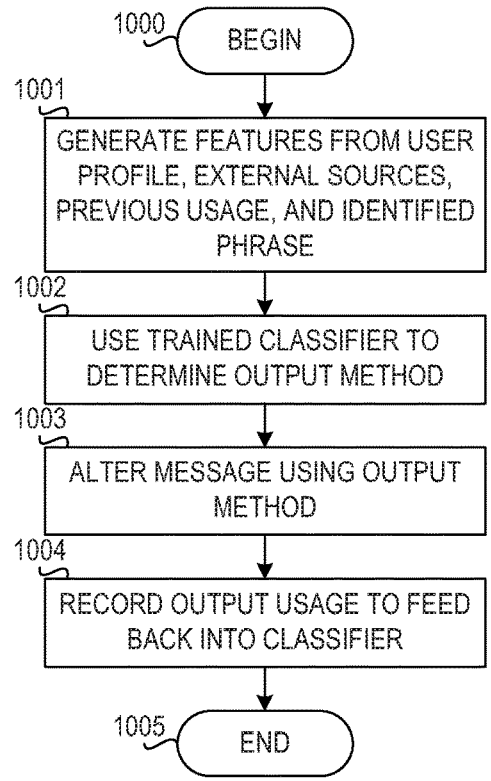

COGNITIVE AGENT FOR CAPTURING REFERENTIAL INFORMATION DURING CONVERSATION MUTING

BACKGROUND

The present application relates generally to an improved data processing apparatus and method and more specifically to mechanisms for capturing referential information during conversation muting.

Online chat may refer to any kind of communication over the Internet that offers a real-time transmission of text messages from sender to receiver. Chat messages are generally short in order to enable other participants to respond quickly. Thereby, a feeling similar to a spoken conversation is created, which distinguishes chatting from other text-based online communication forms such as Internet forums and email. Online chat may address point-to-point communications as well as multicast communications from one sender to many receivers and voice and video chat, or may be a feature of a web conferencing service.

Online chat in a less stringent definition may be primarily any direct text-based or video-based, one-on-one chat or one-to-many group chat (formally also known as synchronous conferencing), using tools such as instant messengers, Internet Relay Chat (IRC), talkers, and possibly multi-user dungeons (MUDs). The expression "online chat" comes from the word chat which means "informal conversation." Online chat includes web-based applications that allow communication—often directly addressed, but anonymous between users in a multi-user environment. Web conferencing is a more specific online service that is often sold as a service, hosted on a web server controlled by the vendor.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions executed by the at least one processor to cause the at least one processor to implement a cognitive system for capturing referential information. The method comprises receiving, by the cognitive system, a first indication that a group text messaging conversation is in a muted state for a first user. The method further comprises detecting, by the cognitive system, a first use of a referential phrase in the group text messaging conversation during a first time period when the group text messaging conversation is in the muted state. The method further comprises receiving, by the cognitive system, a second indication that the group text messaging conversation is in a non-muted state. The method further comprises detecting, by the cognitive system, a second use of the referential phrase in the group text messaging conversation during a second time period when the group text messaging conversation is in the non-muted state. The second time period is subsequent to the first time period. The method further comprises altering, by the cognitive system, a message containing the second use of the referential phrase within the group text messaging conversation In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 4A-4C are example chat displays with captured referential information in accordance with an illustrative embodiment;

FIG. 5 is a block diagram depicting a cognitive agent for classifying referential phrases in a muted conversation in accordance with an illustrative embodiment;

FIG. 6 is a block diagram of a cognitive agent for determining whether to display a referential phrase with an output method in a conversation in accordance with an illustrative embodiment;

FIG. 7 is a flowchart illustrating operation of a cognitive system for capturing referential information during conversation muting in accordance with an illustrative embodiment;

FIG. 8 is a flowchart illustrating operation of a cognitive agent for determining whether the messages of a conversation include referential information in accordance with an illustrative embodiment;

FIG. 9 is a flowchart illustrating operation of a cognitive agent for determining a confidence value representing whether a user will understand referential information in accordance with an illustrative embodiment; and FIG. 10 is a flowchart illustrating operation of a cognitive system for altering a message containing referential information in accordance with an illustrative embodiment.

DETAILED DESCRIPTION

Figure 1:
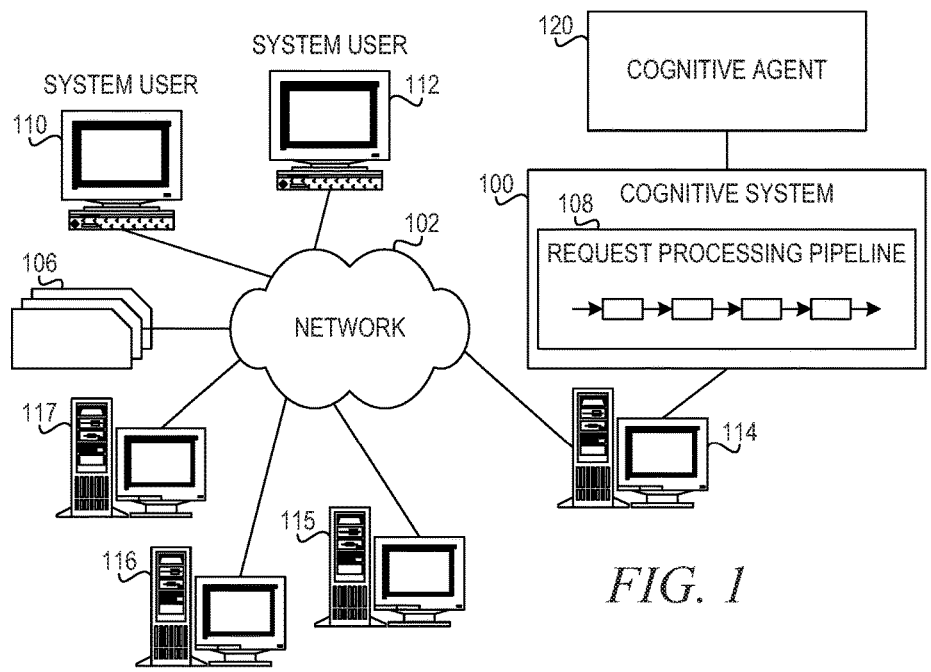
FIG. 1 is an example diagram of a distributed data processing system in which aspects of the illustrative embodiments may be implemented.

Group conversations via text or messaging services are a part of life and serve as important tools for team collaboration. People use them around the world to keep up with friends and family. Group messaging conversations, like any interaction, can contain colloquial or referential information that someone outside the group might not understand. Friends, family, and coworkers share common experiences, have inside jokes, and create abbreviations, acronyms, and colloquialisms to make communication more efficient.

Occasionally, a user may turn off or mute the conversation (e.g., by changing status from "active" to "away"), which can result in missing out on context that can be important for understanding a reference later in the conversation. If a term or phrase comes up later in the conversation, this can result in confusion and possibly derailing the conversation to get the user up-to-speed. Frequently, meaning of the referential term or phrase is not discoverable through typical channels, such as Web searches, because the term or phrase only has meaning in the context of the conversation.

Existing solutions use an all-or-nothing approach for describing contextual information that results in frequent false positives. Existing solutions also do not describe situations where a user is explicitly not participating in the conversation. Existing solutions also require a central management system that is not practical in a multi-user, real-time environment.

The illustrative embodiments provide mechanisms for capturing referential information during muted conversations. The illustrative embodiments provide a cognitive system and a cognitive agent that monitors an ongoing conversation while a user is muted or away. The cognitive agent monitors for referential or colloquial information for the user and collects information on the usage in the context of the conversation. When the user reenters or unmutes the conversation and the referential or colloquial text is used again in the conversation, the cognitive system determines how likely the user is to understand the text. If the user is not likely to understand the term or phrase out of context, then the cognitive agent alters the message in the conversation to assist the user. As used herein, referential information is a term or phrase that has a particular meaning in the context of a conversation and a reference to such a term or phrase relies on the context for the meaning.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
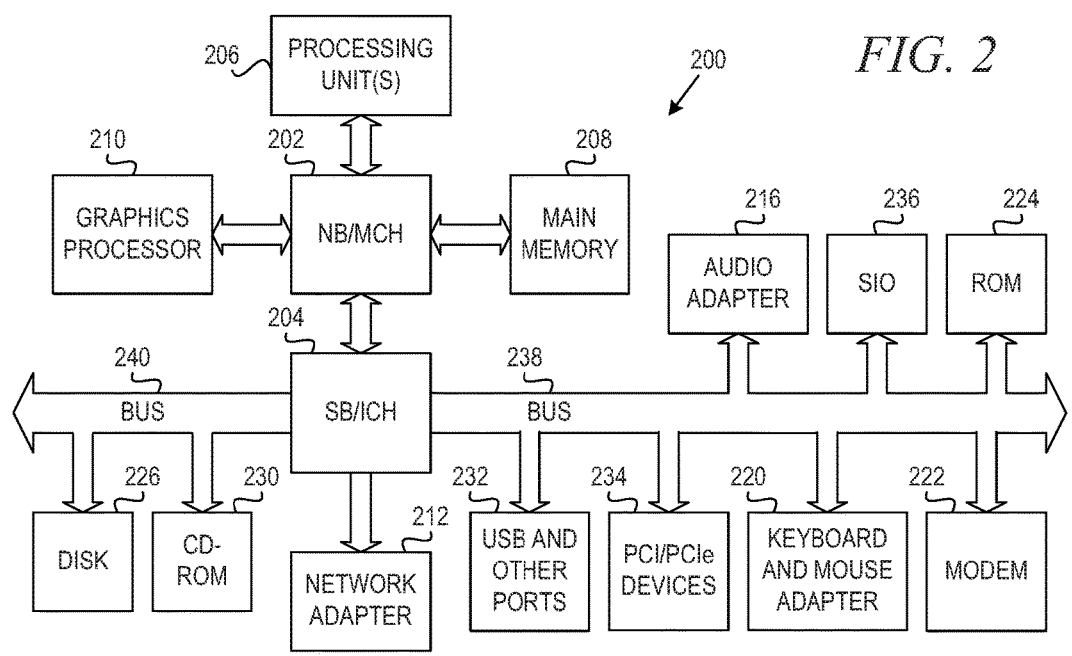
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a schematic diagram of one illustrative embodiment of a cognitive system 100 implementing a request processing pipeline 108, which in some embodiments may be a question answering (QA) pipeline, in a computer network 102. For purposes of the present description, it will be assumed that the request processing pipeline 108 is implemented as a QA pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety.

The cognitive system 100 is implemented on one or more computing devices 114 (comprising one or more processors and one or more memories, and potentially any other computing device elements generally known in the art including buses, storage devices, communication interfaces, and the like) connected to the computer network 102. The network 102 includes multiple computing devices 114-117 in communication with each other and with other devices or components via one or more wired and/or wireless data communication links, where each communication link comprises one or more of wires, routers, switches, transmitters, receivers, or the like. The cognitive system 100 and network 102 enable request processing functionality for one or more cognitive system users via their respective computing devices 110, 112. Other embodiments of the cognitive system 100 may be used with components, systems, subsystems, and/or devices other than those that are depicted herein.

The cognitive system 100 is configured to implement a request processing pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 114-117 on the network 102 include access points for content creators and QA system users. Some of the computing devices 114-117 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, a content creator creates content in a document of the corpus of data 106 for use as part of a corpus of data with the cognitive system 100. The document includes any file, text, article, or source of data for use in the cognitive system 100. Cognitive system users access the cognitive system 100 via a network connection or an Internet connection to the network 102, and input questions to the cognitive system 100 that are answered by the content in the corpus of data 106. In one embodiment, the requests are presented as natural language messages. The cognitive system 100 parses and interprets the messages via a request processing pipeline 108, and provides a response to the cognitive system user, e.g., cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the request processing pipeline 108, which comprises a plurality of stages for processing an input question and the corpus of data 106. The request processing pipeline 108 generates answers for the input question based on the processing of the input question and the corpus of data 106.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a request processing pipeline of the IBM Watson™ cognitive system receives an input request which it then parses to extract the major features of the request, which in turn are then used to formulate queries that are applied to the corpus of data. Based on the application of the queries to the corpus of data, a set of hypotheses, or candidate answers to the input request, are generated by looking across the corpus of data for portions of the corpus of data that have some potential for containing a valuable response to the input question. The request processing pipeline of the IBM Watson™ cognitive system then performs deep analysis on the language of the input request and the language used in each of the portions of the corpus of data found during the application of the queries using a variety of reasoning algorithms.

The scores obtained from the various reasoning algorithms are then weighted against a statistical model that summarizes a level of confidence that the request processing pipeline of the IBM Watson™ cognitive system has regarding the evidence that the potential response, i.e. candidate answer, is inferred by the request. This process is be repeated for each of the candidate answers to generate ranked listing of candidate answers which may then be presented to the user that submitted the input question, or from which a final answer is selected and presented to the user. More information about the request processing pipeline of the IBM Watson™ cognitive system may be obtained, for example, from the IBM Corporation website, IBM Redbooks, and the like. For example, information about the request processing pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As noted above, while the input to the cognitive system 100 from a client device may be posed in the form of a natural language message, the illustrative embodiments are not limited to such. Rather, the input request may in fact be formatted or structured as any suitable type of request which may be parsed and analyzed using structured and/or unstructured input analysis, including but not limited to the natural language parsing and analysis mechanisms of a cognitive system such as the IBM Watson™ cognitive system, to determine the basis upon which to perform cognitive analysis and providing a result of the cognitive analysis.

In the context of the present invention, cognitive system 100 may provide a cognitive functionality for assisting with capturing referential information during conversations. A message aggregator (not shown) may execute on one of computing devices 114-117 or on system user client 110, 112. A cognitive agent (not shown) may execute within cognitive system 100. For example, depending upon the particular implementation, cognitive system may classify terms or phrases in messages as being referential information or not being referential information. In this case, cognitive system 100 and request processing pipeline 108 act as a natural language classifier. In one embodiment, cognitive system 100 may provide a scorer for determining a confidence value representing a likelihood that a user will understand identified referential information outside its original context. In another embodiment, cognitive system 100 and request processing pipeline 108 implement a classifier for identifying an output method for altering a message containing referential information.

As noted above, the mechanisms of the illustrative embodiments utilize specifically configured computing devices, or data processing systems, to perform the operations for assisting with capturing referential information during conversations. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external affects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the cognitive agent for capturing referential information during conversation muting.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
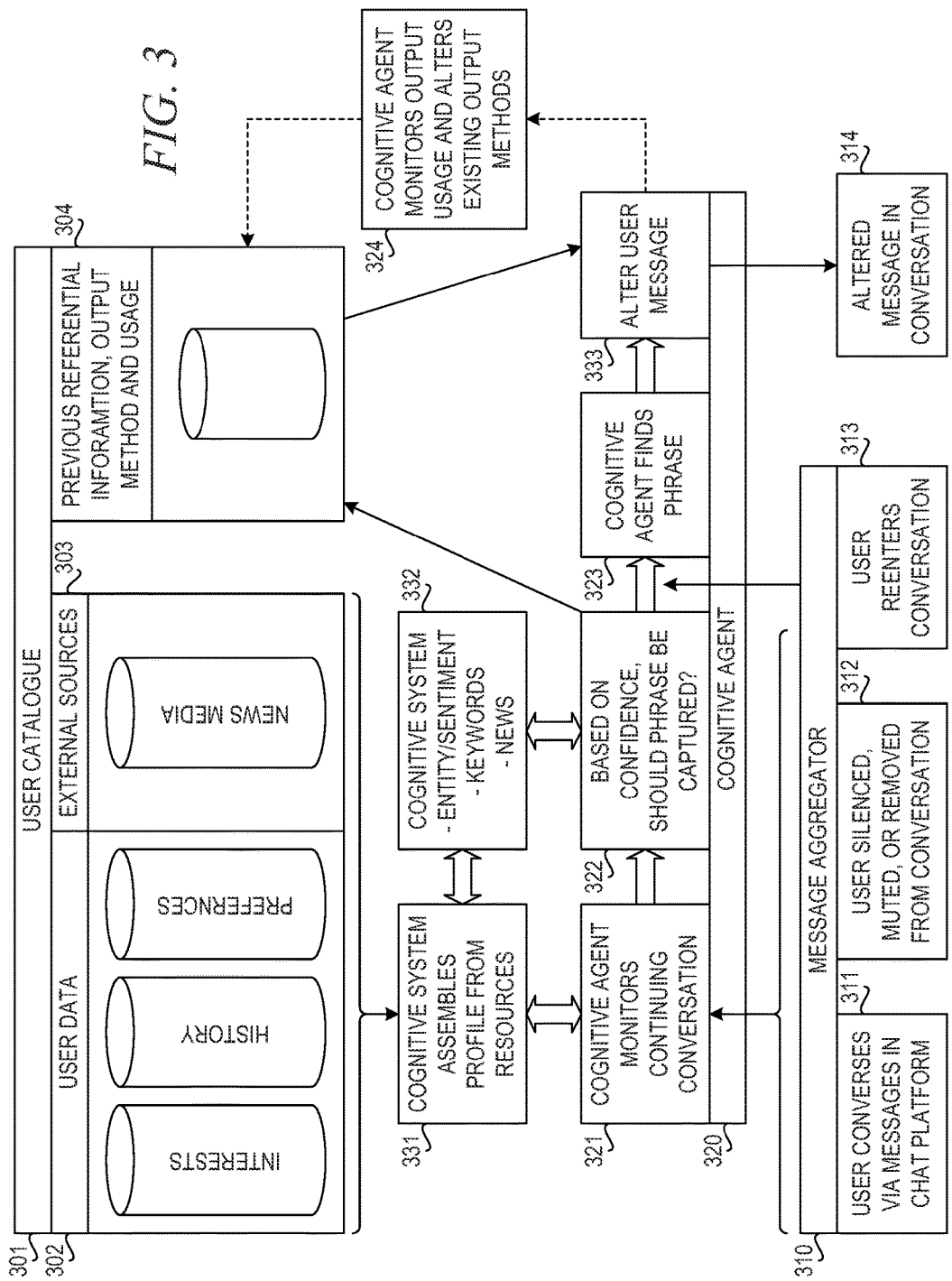
FIG. 3 is a block diagram of a mechanism for capturing referential information during conversation muting in accordance with an illustrative embodiment.

FIG. 3 is a block diagram of a mechanism for capturing referential information during conversation muting in accordance with an illustrative embodiment. Message aggregator 310 aggregates messages during a multi-user chat or messaging session. In block 311, the user converses via messages in the chat platform or messaging service. In block 312, the user silences, mutes, or leaves the conversation by changing status from "active" to "away." Then, in block 321, cognitive agent 320 monitors the continuing conversation through messages received from message aggregator 310.

User catalogue 301 comprises user data 302 and external sources 303. User data 302 includes the user's interests, history, and preferences. External sources 303 include, for example, news media or the like. In block 331, the cognitive system assembles a user profile from the resources in user catalogue 301. In block 332, the cognitive system performs natural language (NL) processing and semantic analysis, including entity/sentiment detection, keyword matching, and identification of news in the messages. The cognitive system performs classification of terms and phrases in messages with regard to whether the terms and phrases are referential and calculates a confidence of the classification.

In block 322, based on the confidence, the cognitive agent 320 determines whether a term or phrase in a message should be captured. In an example embodiment, the cognitive agent 320 stores the referential information in previous referential information, output method, and usage storage 304. Referential and colloquial text can be evaluated against a user's profile internal or external to the conversation application itself for determining confidence in a user's ability to understand. The surrounding text and information can be used as well to determine if other users needed additional information to develop an understanding, thus more likely that the muted user will need the same. Referential/colloquial information could also be developed based on usage in the conversation history. Referential/colloquial information could also be captured based on the mutations of a particular phrase or word.

In block 313, the user reenters the conversation by unmuting or changing the status from "away" to "active." In block 323, the cognitive agent 320 captures the phrase. In block 333, cognitive agent 320 alters the user message in the conversation based on previous referential information, output methods, and usage from storage 304. The cognitive agent generates an altered message in the conversation in block 314.

Enhancements to improve user understanding for the referential text may include altering the actual text that the particular user sees or altering the text itself to use the full name. Enhancements may also include having user interface additions, such as providing the time of the original usage, providing the proper/full name of the text, providing Internet search results, providing inline images, or displaying the surrounding context of the original usage. The cognitive agent 320 is responsible for determining which of these approaches is best for the particular referential text. This may be based on the current conversation speed or text/reference type.

In accordance with one embodiment, the cognitive agent also monitors the output usage and alters the existing output methods in storage 304. Thus, the cognitive agent provides feedback to improve the selection of output methods based on the usage in the messaging session.

In one embodiment, the user need not be "muted" or "away" in the conversation. The system may be enabled when a certain amount of messages are unread by a user in a conversation, optionally triggered by a threshold count.

In one example scenario, Rob is in a group chat with some friends and mutes the chat while in the office. A Drake song with the phrase "running through the 6 with my woes" has just come out, and his friends jokingly use this phrase in the chat while Rob is muted. After leaving the office, Rob unmutes the chat, and the phrase is used again by another participant. However, Rob does not listen to current rap and would not understand the reference, particular in reference to the context within the chat that Rob missed. The cognitive agent understands this because of Rob's music listening history and the recentness of the song. The conversation display may show the album or song along with the conversation context where the phrase was first used. If others originally built an understanding in the conversation, the surrounding context likely holds the required information.

In another example scenario, Liz was in Madrid for a conference with data turned off. Her friends met up and found a new spot called Northside Tavern. The cognitive agent captures "Northside Tavern" as a unique name, the fact that others asked where it is, as well as the fact that the name usage transformed into "Northside." When Liz gets back to the United States, she turns her data back on. Later in the week, her friends send messages about meeting up at "Northside." The cognitive agent alters the naming or displays the full name, as well as an option to view the conversation context when it was first used. The cognitive agent understands that Liz is unlikely to know that location based on the colloquial/group name reference.

FIGS. 4A-4C are example chat displays with captured referential information in accordance with an illustrative embodiment. With reference to FIG. 4A, in a multi-user chat display 410, Lisa submits a message 411 including the term "Northside." In accordance with the illustrative embodiment, the cognitive agent determines that the term references a portion of the chat for which the current user was muted or away.

Turning to FIG. 4B, in multi-user chat display 420, the cognitive agent modifies the message 421 to expand the shortened term "Northside" to the original term "Northside Tavern" from the earlier context. In addition, the cognitive system highlights the term "Northside Tavern" such that the user can select the term for more information.

Next, turning to FIG. 4C, in multi-user chat display 430, and in response to the user selecting the term "Northside Tavern" in message 431, the cognitive agent displays context information 432 to provide more information about the referential information.

FIG. 5 is a block diagram depicting a cognitive agent for classifying referential phrases in a muted conversation in accordance with an illustrative embodiment. Parser 502 receives conversation messages 501 from a message aggregator (not shown). Parser 502 performs parsing and semantic analysis to annotate the conversation messages 501 with tags. Feature extraction component 503 generates a set of features describing the conversation messages. Natural language (NL) classifier 504 processes the features of conversation messages 501 to identify whether the messages contain referential information. In one embodiment, NL classifier 504 may comprises a trained machine learning (ML) model that determines a category for each term or phrase based on the input features and calculates a confidence for each category.

In one embodiment, the categories may include:

Reference: a term or phrase that references an external source, such as a song, news article, television show, or the like, with some relationship to its context.

Unfamiliar: a term or phrase that appears to be unfamiliar to other participants, as evident by users asking clarifying questions about the term or phrase.

Derived: a term or phrase that is a derived version of previously mentioned entity, such as abbreviation, acronym, nickname, or the like.

Call-back: a term or phrase that appears to be unique at first mention and is subsequently repeated with some frequency.

Non-referential: a term or phrase that is not classified as referential information.

As shown in FIG. 5, if conversation messages 501 include referential information, then NL classifier 504 outputs the identified referential phrase 505 and its associated category 506 and confidence score 507.

FIG. 6 is a block diagram of a cognitive agent for determining whether to display a referential phrase with an output method in a conversation in accordance with an illustrative embodiment. A user profile 601 and an identified referential phrase 602 in a group conversation are provided to feature extraction component 603. User profile 601 may include the user's interests, history, and preferences, for example, as well as external sources and previous referential information and output usage. Feature extraction component 603 generates features for the user profile 601 and the referential phrase 602. Feature extraction component 603 may also receive as input the previously determined category and confidence value for the referential phrase 602.

Machine learning (ML) model 604 receives the features as input and generates a confidence score 605, which represents a likelihood that the user will understand referential phrase 602 out of context. ML model 604 is a trained machine learning model that uses a known machine learning techniques to generate a numerical score given a set of input features.

Natural language classifier 606 classifies the referential phrase 602 into a category of output method 607 based on confidence score 605, the features of the user profile 601, referential phrase 602, as well the associated category and confidence of referential phrase 602. The type of referential phrase (e.g., reference, unfamiliar, derived, or call-back), the confidence that the user will understand the referential phrase out of context, and user history and preferences will help to determine the output method 607.

Furthermore, user profile 601 may include a history of how the user used previous output method for previous referential phrases and referential phrase types. This provides a feedback loop that helps to improve the performance of NL classifier 606 in determining the output method 607, as well as the performance of ML model 604 in generating the confidence score 605. In addition, if the user asks a question, even though the output was viewed, the cognitive agent may determine the best response type and feed that information back into future behavior.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 7 is a flowchart illustrating operation of a cognitive agent for capturing referential information during conversation muting in accordance with an illustrative embodiment. Operation begins (block 700), and the user participates in a group conversation (701). The cognitive agent determines whether the user is away (e.g., muted) (block 702). If the user is not away, then operation returns to block 701, and the user participates in the conversation.

If the user is away in block 702, then a cognitive agent monitors the continuing conversation (block 703). The cognitive agent analyzes text of the conversation (block 704) and determines whether the messages of the conversation include referential information (block 705). If there is referential information, then the cognitive agent captures the phrase and its context (block 706). Then, operation returns to block 703, and the cognitive agent monitors the continuing conversation.

If there is not referential information in block 705, then the cognitive agent determines whether the user is active (e.g., the user reenters the conversation) (block 707). If the user is not active, then operation returns to block 703, and the cognitive agent monitors the continuing conversation.

If the user reenters the conversation and is active in block 707, then the cognitive agent monitors the continuing conversation (block 708). The cognitive agent determines whether users in the conversation repeat referential information (block 709). If the users in the conversation repeat referential information in block 709, then the cognitive agent determines a confidence value (C) representing a likelihood that the user will understand the referential information out of context (block 710). The cognitive agent determines whether the confidence value (C) is greater than a predetermined threshold (T) (block 711). If the confidence is greater than the threshold, then the user will understand the referential information without altering the message, and operation returns to block 708 where the cognitive agent monitors the continuing conversation. If the confidence is not greater than the threshold in block 711, then the cognitive agent alters the user message (block 712) to assist the user in understanding. The altered message may modify the phrase, include context from the conversation, include information from an external source, or the like. Thereafter, operation returns to block 708 where the cognitive agent monitors the continuing conversation.

Returning to block 709, if the users in the conversation do not repeat referential information, then the cognitive agent determines whether the user is away (e.g., muted) (block 713). If the user is not away, then operation returns to block 708, where the cognitive agent monitors the continuing conversation with the user active. If the user is away in block 713, then operation returns to block 703 to monitor the conversation with the user away.

FIG. 8 is a flowchart illustrating operation of a cognitive agent for determining whether the messages of a conversation include referential information in accordance with an illustrative embodiment. Operation begins (block 800), and the cognitive agent identifies references to external sources that have some relation to the context (block 801). The cognitive agent identifies such references, if any, as reference information of a type "reference."

The cognitive agent uses a natural language (NL) classifier to identify clarifying questions in the context of the conversation (block 802). The cognitive agent then identifies the topic of the questions within the conversation as referential information of a type "unfamiliar." For example, questions like "where is that?" or "what does that mean?" indicate that a term or phrase in the conversation is unfamiliar to the users, and there is a likelihood that such a term or phrase will be unfamiliar to the muted user as well.

The cognitive agent identifies different versions of the same entity in the context of the conversation (block 803). The cognitive agent identifies such terms or phrases as referential information of a type "derived." For example, a user may first refer to "the Northside Tavern," and in a subsequent message a second user refers to "the Northside," and then another user may refer to "Northside." If a user later refers to "Northside" when the muted user reenters the conversation, then this will be identified as referential information.

The cognitive agent identifies phrases with uniqueness and post-frequency (block 804). For example, if a user refers to "the bunny man" in a conversation when referring to something strange that pops up, then this would be considered a unique phrase at its first instance. The user may be referring to a relatively unknown urban legend making the phrase unique to the system. However, the phrase is given meaning as it relates to the context of the conversation. If users subsequently use this phrase with some frequency to refer to something strange that pops up, then the cognitive agent may identify this phrase as referential information of type "call-back."

The cognitive agent then determines whether a referential phrase is identified in blocks 801-804 (block 805). If the cognitive agent determines that a referential phrase is identified, then the cognitive agent calculates a confidence value for the phrase and its type (block 806). The cognitive agent then records the identified referential phrase, the type (e.g., reference, unfamiliar, derived, or call-back), and its confidence value (block 807). Thereafter, or if no phrase is identified in block 805, operation ends (block 808).

FIG. 9 is a flowchart illustrating operation of a cognitive agent for determining a confidence value representing whether a user will understand referential information in accordance with an illustrative embodiment. Operation begins (block 900), and the cognitive agent generates features from a user profile, external sources, previous usage, and an identified referential phrase (block 901). The cognitive system then uses a trained machine learning (ML) model to calculate a confidence score based on the features (block 902). Thereafter, operation ends (block 903).

FIG. 10 is a flowchart illustrating operation of a cognitive system for altering a message containing referential information in accordance with an illustrative embodiment. Operation begins (block 1000), and the cognitive system generates features from a user profile, external sources, previous usage, and the identified referential phrase (block 1001). The cognitive system uses a trained classifier to determine an output method based on the features (block 1002).

The output method may be selected from the following: expanding the phrase, displaying the context from the conversation, providing information from an external source, providing a link to the context within the chat, etc. If another user asks a question in the same context, then the answer or response stream can be captured alongside the question. This could then be displayed along with the future instance of the referential information. Search results from online engines or social media may be used to display results and determine the appropriate output response considering group vs. world context. The current/real-time conversation for the future usage must also be considered. If the conversation cadence is fast, then the user likely will not want to produce an intrusive output. If the conversation actually clarifies the phrase, then further output is not necessary.

The cognitive system then alters the message using the identified output method (block 1003). The cognitive system records the output usage to feed back to the classifier (block 1004). Thereafter, operation ends (block 1005).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for capturing referential information during conversation muting. The mechanisms of the illustrative embodiments are dynamic and adaptable. The mechanisms of the illustrative embodiments require far less input from the end user. In addition, the mechanisms of the illustrative embodiments produce fewer false positives for text alteration.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions executed by the at least one processor to cause the at least one processor to implement a cognitive system for capturing referential information, the method comprising:

receiving, by a message aggregator executing within the cognitive system, a first indication that a group text messaging conversation is in a muted state for a first user;

detecting, by a cognitive agent executing within the cognitive system, a first use of a referential phrase in the group text messaging conversation during a first time period when the group text messaging conversation is in the muted state, wherein detecting the first use of the referential phrase comprises:

parsing, by a parser executing within the cognitive agent, one or more conversation message within the group text messaging conversation to perform parsing and semantic analysis to annotate the one or more conversation messages;

extracting, by a feature extraction component executing within the cognitive agent, a set of features from the one or more conversation message describing the one or more conversation message; and processing, by a natural language classifier component executing within the cognitive agent, the set of features to identify that the one or more conversation messages contain the first use of the referential phrase using a machine learning model that determines a category for each term or phrase based on the set of features and calculates a confidence for each category;

receiving, by the message aggregator, a second indication that the group text messaging conversation is in a non-muted state for the first user;

detecting, by the cognitive agent, a second use of the referential phrase in the group text messaging conversation during a second time period when the group text messaging conversation is in the non-muted state, wherein the second time period is subsequent to the first time period;

altering, by the cognitive agent, a message containing the second use of the referential phrase within the group text messaging conversation within a multi-user chat display;

determining, by the cognitive system, a first probability that the first user understands the referential phrase; and providing, by the cognitive system, first information to the first user within the multi-user chat display when the first probability is below a threshold, wherein the first information pertains to the referential phrase.

2. The method of claim 1, wherein the determining the first probability comprises evaluating a profile for the first user.

3. The method of claim 1, wherein the determining the first probability comprises evaluating text surrounding the second use of referential phrase.

4. The method of claim 1, wherein the providing first information to the first user further comprises replacing the referential phrase with the first information.

5. The method of claim 1, wherein detecting the first use of the referential phrase comprises identifying a reference to an external source of information, identifying a topic of clarifying questions in the group text messaging conversation, identifying multiple versions of an entity in the group text messaging conversation, or identifying a phrase with uniqueness and post-frequency.

6. The method of claim 1, wherein detecting the first use of the referential phrase comprises recording the first use of the referential phrase with identification of a type of referential phrase, and a confidence value.

7. The method of claim 1, wherein altering the message containing the second use of the referential phrase comprises determining an output method for altering the message using a trained machine learning classifier that receives as input previous usage of output methods by the first user.

8. A computer program product comprising a computer readable storage medium having a computer readable program stored therein, wherein the computer readable program, when executed on a computing device, causes the computing device to implement a cognitive system for capturing referential information, wherein the computer readable program causes the computing device to:

receive, by a message aggregator executing within the cognitive system, a first indication that a group text messaging conversation is in a muted state for a first user, detect, by a cognitive agent executing within the cognitive system, a first use of a referential phrase in the group text messaging conversation during a first time period when the group text messaging conversation is in the muted state wherein detecting the first use of the referential phrase comprises:

parsing, by a parser executing within the cognitive agent, one or more conversation message within the group text messaging conversation to perform parsing and semantic analysis to annotate the one or more conversation messages;

extracting, by a feature extraction component executing within the cognitive agent, a set of features from the one or more conversation message describing the one or more conversation message; and processing by a natural language classifier component executing within the cognitive agent, the set of features to identify that the one or more conversation messages contain the first use of the referential phrase using a machine learning model that determines a category for each term or phrase based on the set of features and calculates a confidence for each category;

receive, by the message aggregator, a second indication that the group text messaging conversation is in a non-muted state for the first user;

detect, by the cognitive agent, a second use of the referential phrase in the group text messaging conversation during a second time period when the group text messaging conversation is in the non-muted state, wherein the second time period is subsequent to the first time period;

alter, by the cognitive agent, a message containing the second use of the referential phrase within the group text messaging conversation within a multi-user chat display;

determine, by the cognitive system, a first probability that the first user understands the referential phrase; and provide, by the cognitive system, first information to the first user within the multi-user chat display when the first probability is below a threshold, wherein the first information pertains to the referential phrase.

9. The computer program product of claim 8, wherein the determining the first probability comprises evaluating a profile for the first user.

10. The computer program product of claim 8, wherein the determining the first probability comprises evaluating text surrounding the second use of referential phrase.

11. The computer program product of claim 8, wherein the providing first information to the first user further comprises replacing the referential phrase with the first information.

12. The computer program product of claim 8, wherein detecting the first use of the referential phrase comprises identifying a reference to an external source of information, identifying a topic of clarifying questions in the group text messaging conversation, identifying multiple versions of an entity in the group text messaging conversation, or identifying a phrase with uniqueness and post-frequency.

13. The computer program product of claim 8, wherein detecting the first use of the referential phrase comprises recording the first use of the referential phrase with identification of a type of referential phrase, and a confidence value.

14. The computer program product of claim 8, wherein altering the message containing the second use of the referential phrase comprises determining an output method for altering the message using a trained machine learning classifier that receives as input previous usage of output methods by the first user.

15. An apparatus comprising:
a processor, and a memory coupled to the processor, wherein the memory comprises instructions which, when executed by the processor, cause the processor to implement a cognitive system for capturing referential information, wherein the instructions cause the processor to:

receive, by a message aggregator executing within the cognitive system, a first indication that a group text messaging conversation is in a muted state for a first user;

detect, by a cognitive agent executing within the cognitive system, a first use of a referential phrase in the group text messaging conversation during a first time period when the group text messaging conversation is in the muted state, wherein detecting the first use of the referential phrase comprises:
  parsing, by a parser executing within the cognitive agent, one or more conversation message within the group text messaging conversation to perform parsing and semantic analysis to annotate the one or more conversation messages;
  extracting, by a feature extraction component executing within the cognitive agent, a set of features from the one or more conversation message describing the one or more conversation message; and
  processing, by a natural language classifier component executing within the cognitive agent, the set of features to identify that the one or more conversation messages contain the first use of the referential phrase using a machine learning model that determines a category for each term or phrase based on the set of features and calculates a confidence for each category;

receive, by the message aggregator, a second indication that the group text messaging conversation is in a non-muted state for the first user;

detect, by the cognitive agent, a second use of the referential phrase in the group text messaging conversation during a second time period when the group text messaging conversation is in the non-muted state, wherein the second time period is subsequent to the first time period;

alter, by the cognitive agent, a message containing the second use of the referential phrase within the group text messaging conversation within a multi-user chat display;

determine, by the cognitive system, a first probability that the first user understands the referential phrase; and provide, by the cognitive system, first information to the first user within the multi-user chat display when the first probability is below a threshold, wherein the first information pertains to the referential phrase.

16. The apparatus of claim 15, wherein the determining the first probability comprises evaluating a profile for the first user.

17. The apparatus of claim 15, wherein the determining the first probability comprises evaluating text surrounding the second use of referential phrase.

18. The apparatus of claim 15, wherein detecting the first use of the referential phrase comprises identifying a reference to an external source of information, identifying a topic of clarifying questions in the group text messaging conversation, identifying multiple versions of an entity in the group text messaging conversation, or identifying a phrase with uniqueness and post-frequency.

19. The apparatus of claim 15, wherein detecting the first use of the referential phrase comprises recording the first use of the referential phrase with identification of a type of referential phrase, and a confidence value.

20. The apparatus of claim 15, wherein altering the message containing the second use of the referential phrase comprises determining an output method for altering the message using a trained machine learning classifier that receives as input previous usage of output methods by the first user.

* * * * *